US009204129B2

(12) United States Patent
Keshavmurthy et al.

(10) Patent No.: US 9,204,129 B2
(45) Date of Patent: Dec. 1, 2015

(54) NON-CONTACT SENSING SYSTEM HAVING MEMS-BASED LIGHT SOURCE

(75) Inventors: Shyam P. Keshavmurthy, Ann Arbor, MI (US); David Crowther, Bloomfield, MI (US); George C. Lin, Ann Arbor, MI (US); Craig Manning, Farmington Hills, MI (US); Martin P. Koskella, Ann Arbor, MI (US); Brett Hibbard, Swartz Creek, MI (US); Ralph Stefan, Brighton, MI (US); Jason Wilson, Plymouth, MI (US); Richard Krakowski, Troy, MI (US)

(73) Assignee: PERCEPTRON, INC., Plymouth, MI (US)

( * ) Notice: Subject to any disclaimer, the term of this patent is extended or adjusted under 35 U.S.C. 154(b) by 733 days.

(21) Appl. No.: 12/943,344

(22) Filed: Nov. 10, 2010

(65) Prior Publication Data

US 2012/0062706 A1 Mar. 15, 2012

Related U.S. Application Data

(60) Provisional application No. 61/383,085, filed on Sep. 15, 2010.

(51) Int. Cl.
*H04N 13/02* (2006.01)
*G01B 11/245* (2006.01)
(Continued)

(52) U.S. Cl.
CPC .......... *H04N 13/0253* (2013.01); *G01B 11/245* (2013.01); *G01B 11/2518* (2013.01); *G01S 17/48* (2013.01); *G01S 17/87* (2013.01); *G01S 17/89* (2013.01); *H04N 13/0239* (2013.01)

(58) Field of Classification Search
CPC ......... G06F 3/421; G06F 3/425; G06F 3/428; G06F 3/304; G06F 2203/04108
USPC .......................................................... 348/47
See application file for complete search history.

(56) References Cited

U.S. PATENT DOCUMENTS 4,535,363 A * 8/1985 Harada .................... H04N 3/15
348/207.99
5,028,799 A 7/1991 Chen et al.
(Continued)

FOREIGN PATENT DOCUMENTS

JP 2002236264 8/2002
JP 2004085596 3/2004
(Continued)

*Primary Examiner* — Andy Rao
*Assistant Examiner* — Obafemi Sosanya
(74) *Attorney, Agent, or Firm* — Harness, Dickey & Pierce, P.L.C.

(57) ABSTRACT

A non-contact sensing system is provided for acquiring three-dimensional contour information of an object. The system is comprised of: a light source subsystem operable to scan a point of light in an area of illumination; a first imaging device having a field of view arranged to intersect with the illumination area and operable to capture image data; and a second imaging device having a field of view arranged to intersect with the illumination area and operable to capture image data. A first control module is in data communication with the first imaging device to determine contour information for an object in the field of view of the first imaging device and report the contour information for the object in a common coordinate system. A second control module is in data communication with the second imaging device to determine contour information for the object in the field of view of the second imaging device and report the contour information for the object in the common coordinate system. Moreover, the light source subsystem is calibrated to report position of the point of light in the common coordinate system.

16 Claims, 5 Drawing Sheets

(51) Int. Cl.
*G01B 11/25* (2006.01)
*G01S 17/48* (2006.01)
*G01S 17/87* (2006.01)
*G01S 17/89* (2006.01)

(56) References Cited

U.S. PATENT DOCUMENTS

| | | |
|---|---|---|
| 6,473,167 B1 | 10/2002 | Odell |
| 6,624,899 B1 | 9/2003 | Clark |
| 6,733,135 B2 | 5/2004 | Dho |
| 6,910,776 B2 | 6/2005 | Dho et al. |
| 6,956,963 B2 * | 10/2005 | Ulrich ............... G01B 11/2513 257/E21.001 |
| 7,029,126 B2 | 4/2006 | Tang |
| 7,252,394 B1 | 8/2007 | Fu |
| 7,277,173 B1 | 10/2007 | Bock et al. |
| 7,346,234 B2 | 3/2008 | Davis et al. |
| 2001/0030642 A1 * | 10/2001 | Sullivan ............... G06F 3/0421 345/157 |
| 2002/0105653 A1 | 8/2002 | Pezeshki |
| 2002/0180988 A1 | 12/2002 | Johnston et al. |
| 2003/0011751 A1 | 1/2003 | Sakata et al. |
| 2005/0052635 A1 * | 3/2005 | Xie ....................... G01S 17/48 356/3.07 |
| 2005/0146764 A1 | 7/2005 | Deng et al. |
| 2006/0139714 A1 | 6/2006 | Gruhlke et al. |
| 2006/0158662 A1 | 7/2006 | Schelinski et al. |
| 2006/0269896 A1 | 11/2006 | Liu et al. |
| 2006/0291063 A1 | 12/2006 | Takemoto |
| 2007/0070046 A1 | 3/2007 | Sheynblat et al. |
| 2008/0013826 A1 * | 1/2008 | Hillis ................. G06K 9/00355 382/154 |
| 2008/0037090 A1 | 2/2008 | Miller et al. |
| 2008/0049101 A1 | 2/2008 | Yamazaki |
| 2008/0073484 A1 | 3/2008 | Kane |
| 2009/0262363 A1 | 10/2009 | Keshavmurthy et al. |
| 2011/0115904 A1 * | 5/2011 | Te-Yuan ............... G06F 3/0428 348/135 |

FOREIGN PATENT DOCUMENTS

| | | |
|---|---|---|
| JP | 2006189573 | 7/2006 |
| JP | 2006343397 | 12/2006 |
| JP | 2008-256465 | 10/2008 |
| JP | 2008241643 | 10/2008 |
| WO | WO 2006-076731 | 7/2006 |

* cited by examiner

NON-CONTACT SENSING SYSTEM HAVING MEMS-BASED LIGHT SOURCE

CROSS-REFERENCE TO RELATED APPLICATIONS

This application claims the benefit of U.S. Provisional Application No. 61/383,085, filed on Sep. 15, 2010 The entire disclosure of the above application is incorporated herein by reference.

FIELD

The present disclosure relates to a non-contact sensing system for acquiring three-dimensional contour information for an object using a MEMS-based light source.

BACKGROUND

Existing machine vision applications use a multiplicity of light emitting diode (LED) light sources, single or multi line lasers and structured white lights to obtain three-dimensional contour information through an acquired image. The drawback of such solutions is that the flood illumination provided by these types of light source or any distributed sources do not carry three-dimensional information, and they need additional information either through a structured light or a laser line source. This leads to a complex imaging system.

Complexity of imaging systems can be reduced through the use of programmable MEMS-based light sources. MEMS-based light sources can be programmed to scan a point of light at a very high frequency in an illumination area during the exposure cycle of an imaging device. In this way, the imaging device is able to more effectively capture three-dimensional contour information in an acquired image. This disclosure sets forth an improved imaging system that relies upon a MEMS-based light source. This section provides background information related to the present disclosure which is not necessarily prior art.

SUMMARY

A non-contact sensing system is provided for acquiring three-dimensional contour information of an object. The system is comprised of: a light source subsystem operable to scan a point of light in an area of illumination; a first imaging device having a field of view arranged to intersect with the illumination area and operable to capture image data; and a second imaging device having a field of view arranged to intersect with the illumination area and operable to capture image data. A first control module is in data communication with the first imaging device to determine contour information for an object in the field of view of the first imaging device and report the contour information for the object in a common coordinate system. A second control module is in data communication with the second imaging device to determine contour information for the object in the field of view of the second imaging device and report the contour information for the object in the common coordinate system. Of note, the light source subsystem is calibrated to report position of the point of light in the common coordinate system.

In another aspect of this disclosure, the non-contact sensing system may employ multiple light sources with multiple imaging devices. For example, the system may include: a first light source subsystem operable to project a point of light and scan the point of light in a first area of illumination, where the first light source subsystem uses a micro electro-mechanical system (MEMS) actuated mirror to scan the point of light; a first imaging device having a field of view arranged to intersect with the first illumination area and operable to capture image data therein; a second light source subsystem operable to project a point of light and scan the point of light in a second area of illumination that is adjacent to the first illumination area, where the second light source subsystem uses a micro electro-mechanical system (MEMS) actuated mirror to scan the plane of light; and a second imaging device having a field of view arranged to intersect with the second illumination area and operable to capture image data therein; wherein the first light source subsystem, the first imaging device, the second light source subsystem and the second imaging device reside in a housing of the device. These sensing components may be integrated into a single housing and arranged in a "reverse overlap" manner in order to reduce spacing between the components and thus reduce overall size of the housing.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
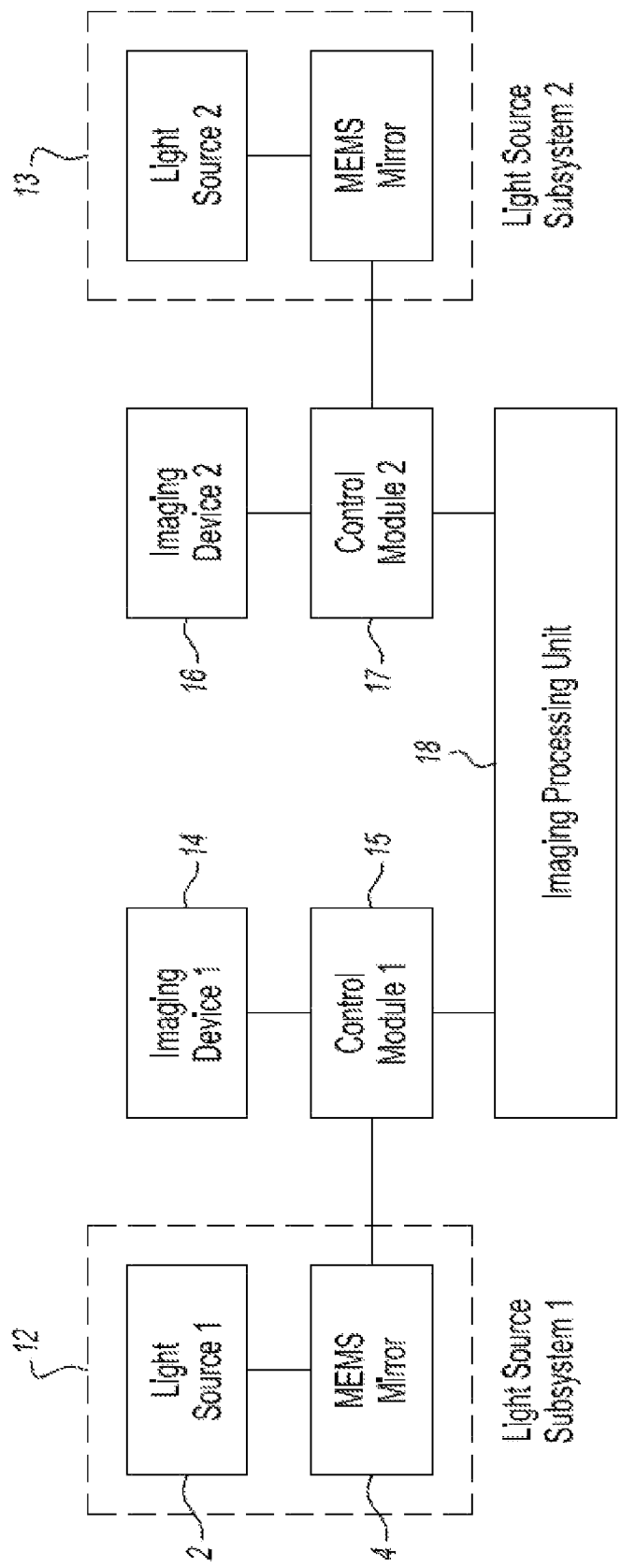
FIG. 1 is a block diagram depicting an improved non-contact sensing system for acquiring three-dimensional contour information.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an improved non-contact sensing system 10 for acquiring three-dimensional contour information. The sensing system 10 is comprised generally of one or more light source subsystems 12, 13, first and second imaging devices 14, 16, first and second control modules 15, 17 and an image processing unit 18. Each of these components is further described below. It is to be understood that only the relevant components of the sensing system are discussed in relation to FIG. 1, but that other components may be needed to construct an operational system.

Each of the light source subsystems 12, 13 is operable to project a point of light and scan the point of light in an area of illumination. In one exemplary embodiment, a light source subsystem 12, 13 is comprised of a laser light source 2 and a micro electro-mechanical system (MEMS) mirror device 4. The light source 2 is arranged to project light towards the MEMS mirror device 4. The MEMS mirror device 4 preferably employs electrostatic actuation to position the mirror and thereby direct the light in the area of illumination. An exemplary MEMS mirror device 4 is the two-axis scanning micromirror device commercially available from Mirrorcle Technologies Inc. Other types of MEMS mirror devices are also contemplated by this disclosure.

Figure 2:
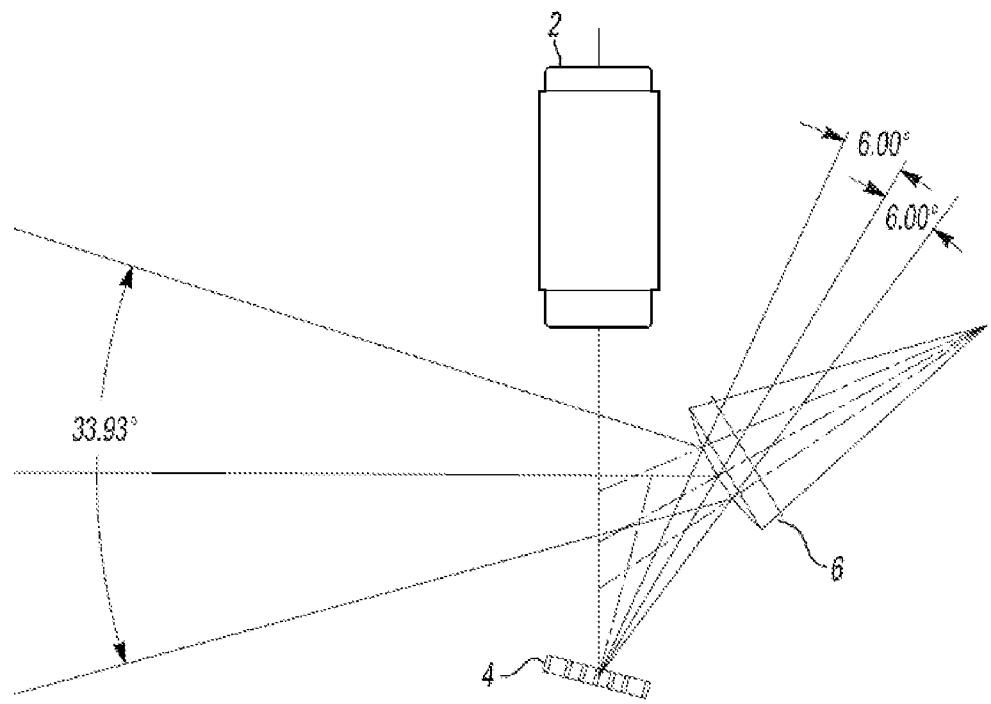
FIG. 2 is a diagram of an exemplary light source modified to increase the angular scanning capability of the MEMS mirror device.

The scanning angle of the MEMS mirror device 4 may be limited. In order to satisfy the field of view of short standoff sensors, it is desirable to amplify the angular scanning capability of the MEMS mirror device 4. To do so, light from the MEMS mirror device may be directed towards a stationary reflective element 6, such as a spherical convex mirror. The amount of angular magnification is a function of the mirror's radius of curvature and the respective geometry between the laser source, the MEMS mirror and the spherical mirror. For example, a MEMS mirror having 12 (+/−6) degrees of angular motion are magnified to almost 34 degrees along the vertical axis as shown in FIG. 2. Geometric parameters are provided for illustration purposes and may be varied to achieve differing amounts of angular magnification. Although the geometry intrinsically participates into the magnification value, the easiest way to tailor the magnification is to change the radius of curvature of the spherical mirror. The smaller the radius of the spherical mirror, the larger the magnification value. Conversely, it is also possible to decrease the magnification of the output laser spot and increase the positioning resolution without changing the MEMS control resolution by replacing the concave spherical mirror with a convex spherical mirror. Other types of reflective elements fall within the scope of this disclosure.

During operation, the point of light projected by a light source subsystem 12, 13 is controlled by an associated control module 15, 17. Light from the light source subsystem is preferably scanned at very high frequency during exposure cycle of an imaging device. The scanning speed of the light source subsystem is considerably faster (e.g., 100 times) than the shutter speed of the imaging devices. By using a combination of scanning speed and shutter speed, an imaging device can obtain either line data or multi-line data or area illumination. The quality of area illumination is of similar quality as obtained through flood lighting sources, such as LEDs. The advantage of this illumination approach is that it uses the capability of a calibrated MEMS device that can execute reproducible precise paths. Thus, every position of the MEMS mirror during scanning is precisely known to and/or reported to the associated control module.

Figure 3:
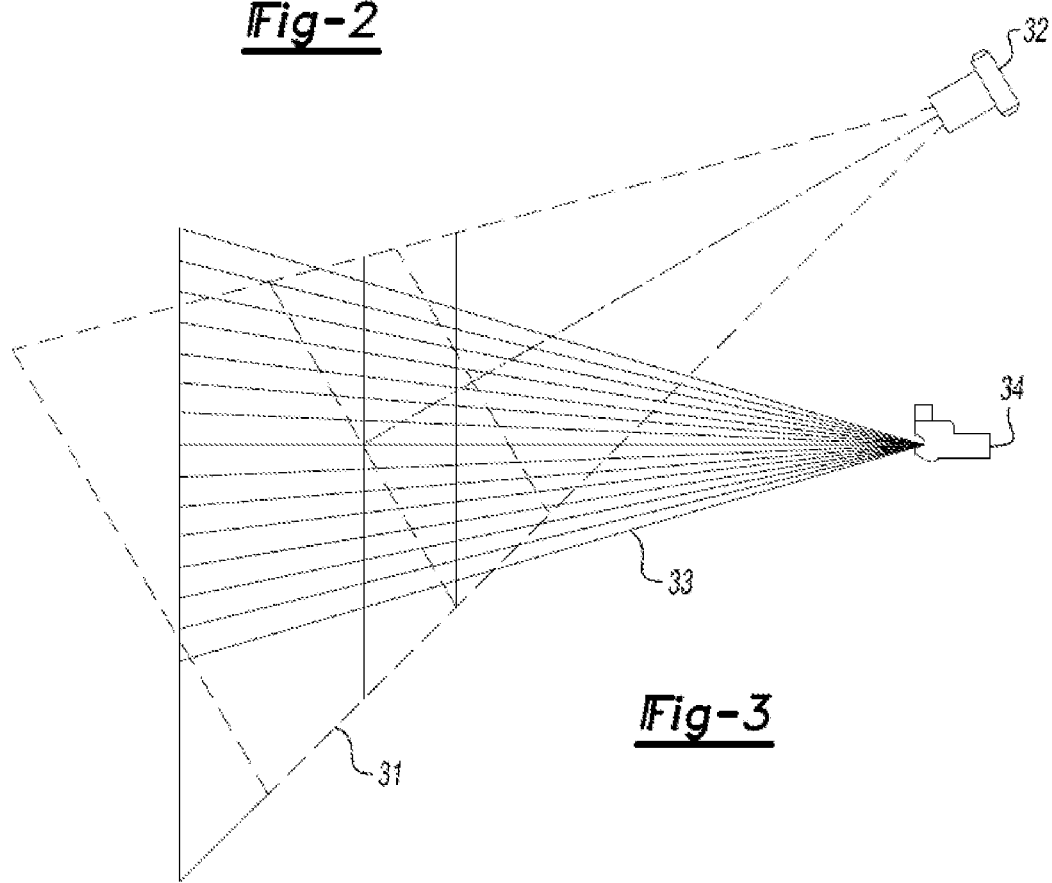
FIG. 3 is a diagram illustrating an exemplary triangulation arrangement of a light source with an imaging device.

Traditionally, the field of view for a given sensor is defined by the field of view of the imaging device convolved with the scanning field of the light source subsystem as shown in FIG. 3. In order to increase the scanning efficiency of the sensor while maintaining measurement resolution, it is highly desirable to double the field of view in the X direction (along the sensor main axis). For a simple vision sensor, doing so would be achieved by adding a second imaging device next to the first imaging device so that the combined field of view doubles in the X direction. For sensors employing triangulation measurement, the problem is significantly more complex. Adding a second camera does not work because the field scanned by the triangulated light source does not intersect the field of view of the second camera efficiently, if at all. Changing the X scanning component of the light source does not solve the problem as well, since the triangulation parameters for the second camera are intrinsically different from the first one and therefore would require a different light source configuration all together.

Figure 4:
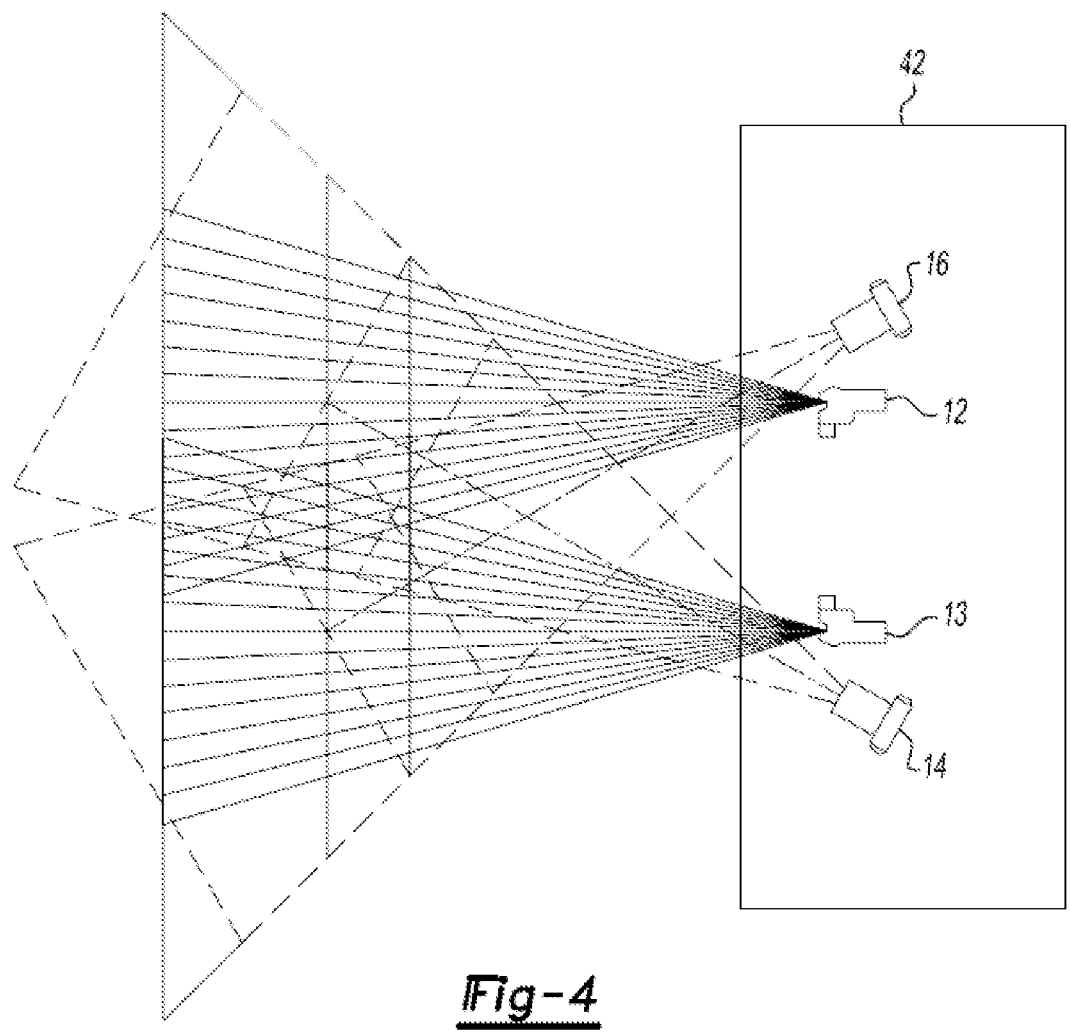
FIG. 4 is a diagram illustrating an exemplary embodiment of the non-contact sensing system employing a reverse overlap arrangement.

FIG. 4 illustrates an arrangement that increases the field of view of an imaging system in the X direction. In the arrangement, the illumination area generated by the first light source subsystem 12 is positioned adjacent to the illumination area are generated by the second light source subsystem 13. Imaging devices 14, 16 are then arranged to capture image data in the illumination areas. More specifically, the first imaging device 14 is arranged such that its field of view intersects with the illumination area generated by the first light source subsystem 12; whereas, the second imaging device 16 is arranged such that its field of view intersects with the illumination area generated by the second light source subsystem 13. In this way, the field of view of the system 10 is increased in X direction.

Each imaging device works independently to measure features in its half of the double X field of view. That is, the first control module is in data communication with the first imaging device to capture image data in the field of view of the first imaging device; and the second control module is in data communication with the second imaging device to capture image data in the field of view of the second imaging device. To minimize crosstalk between imaging devices, operation is preferably coordinated between the two imaging devices. For example, the first imaging device will capture image data while light from the first light source subsystem is scanned. Once the first imaging device has captured the image data, the second imaging device will capture image data while light from the second light source subsystem is scanned. During the time in which the second imaging device is capturing image data, image data captured by the first imaging device is being processed and vice versa. Alternatively, each light source subsystem may project a distinct laser wavelength, thereby enabling the imaging device to capture image data concurrently. In any case, image data from each of the imaging devices is then reported to and combined by the imaging processing unit 18 in a manner further described below.

In an alternative arrangement, the sensing system 10 may employ a single light source to generate an illumination area. In this arrangement, the first and second imaging devices capture image data primarily in distinct non-overlapping portions of the illumination area although some overlap between the imaging devices is preferable for calibration purposes. Each imaging device works independently to measure features in its portion of the illumination area. Other arrangements can employ more or less imaging devices cooperating in a similar manner with one or more light source subsystems.

In one exemplary embodiment, components of the sensing system 10 are integrated into a single housing 42. To reduce spacing between the components and thus the overall size of the housing, the components are arranged in a "reverse overlap" manner as shown in FIG. 4. That is, the first and second light source subsystems 12, 13 are interposed collectively between the first and the second imaging devices 14, 16, such that the first light source subsystem 12 is position between the second imaging device 16 and the second light source subsystem 13 while the second light source subsystem 13 is positioned between the first imaging device 14 and the first light source subsystem 12. It is noted that the first light source subsystem 12 and the second light source subsystem 13 are arranged in relation to each other such that the first illumination area overlaps with the second illumination area. In addition, the first imaging device 14 is arranged so that its field of view intersects with the illumination area scanned by the first light source subsystem 12 and the second imaging device 16 is arranged so that its field of view intersects with the illumination area scanned by the second light source subsystem 13.

Actual position of each component with respect to the other components is tailored to match the best field coverage configuration throughout the depth of field (from near field to far field) of the imaging devices. For example, placement of a light source in relation to its associated imaging device can be determined by minimizing the triangulation angle formed by the light source and the imaging device while maintaining a desired image resolution for the captured image data in a manner known in the art. It is readily understood that precise placement of components of the sensing system (or in the housing) is dependent upon the desired field coverage and image resolution.

Figure 5:
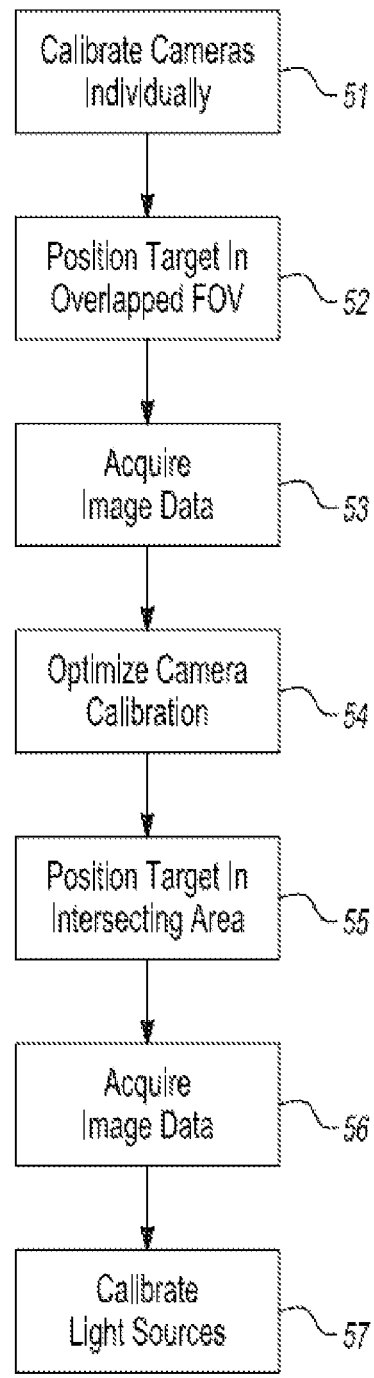
FIG. 5 is a flowchart depicting an exemplary calibration procedure for the non-contact sensing system.

Combining data from multiple imaging devices requires the different system components be calibrated properly. An exemplary procedure for calibrating the sensing system is further described in relation to FIG. 5.

First, the imaging devices are individually calibrated at 51 to an external reference frame. Imaging devices are assumed to be calibrated to report measurement data in a localized reference frame. Techniques for calibrating an imaging device in relation to an external reference frame are readily known in the art. Further details regarding a suitable calibration procedure that employs a laser tracker may be found, for example, in U.S. Pat. No. 6,134,507 which is incorporated by reference herein. Regardless of the calibration technique, this step yields a transform for each imaging device that maps measurements from its localized reference frame to the external reference frame. The external reference frame refers to a common coordinate system and may be associated with a workpiece being measured, the overall gauging station or some other reference frame.

Transforms for each imaging device may be optimized further. For imaging devices having overlapped field of views, one or more targets are placed into the overlapping space at 52. One exemplary target is an illuminated sphere. Image data is then acquired at step 53 by both imaging devices. In the case of a single target, the target may be moved to different locations within the overlapping space and image data is acquired by both imaging devices for each different location. Each target location is translated from the local reference frame (of the imager) to the common coordinate system using the respective transform for the imager. In other words, a first location of the target in the common coordinate system is computed using the image data captured by the first imaging device and its corresponding transform and a second location of the target in the common coordinate space is computed using the image data captured by the second imaging device and its corresponding transform. In theory, the two computed locations of the target should be the same since the target remained stationary while the image data was acquired by both imaging devices. In practice, there will be a difference between the two computed locations. Thus, by minimizing the difference (i.e., error) between the two computed locations, the transforms for the first and second imaging device can be calibrated more precisely as indicated at 54. A least squares method or some other regression technique may be applied to minimize the error amongst the two transforms.

Next, the light source subsystems are also calibrated to the common coordinate system. For each light source, a target is placed 55 at a location where the field of view of a given imaging device intersects the illumination area of the light source subsystem. One exemplary target is a corner although other suitable targets are contemplated. The target is then illuminated by the light source and image data for the target is captured at 56 by the given imaging device. As noted above, the position of the light in the illumination area is precisely known in the reference frame of the MEMS mirror device. Position of the target in the common coordinate system can also be determined from the image data using the transform for the imaging device. Given the positional information of the target in the common coordinate system, a transform can be derived that maps position of the light in the light source space to a position in the common coordinate system. In this way, each light source subsystem can be calibrated 57 to report the position of light in the common coordinate system. To the extent that one or more imaging devices have a field of view that intersects with the illumination area of a light source subsystem, the independently operated light source subsystem can be calibrated to each of these imaging devices.

Figure 6:
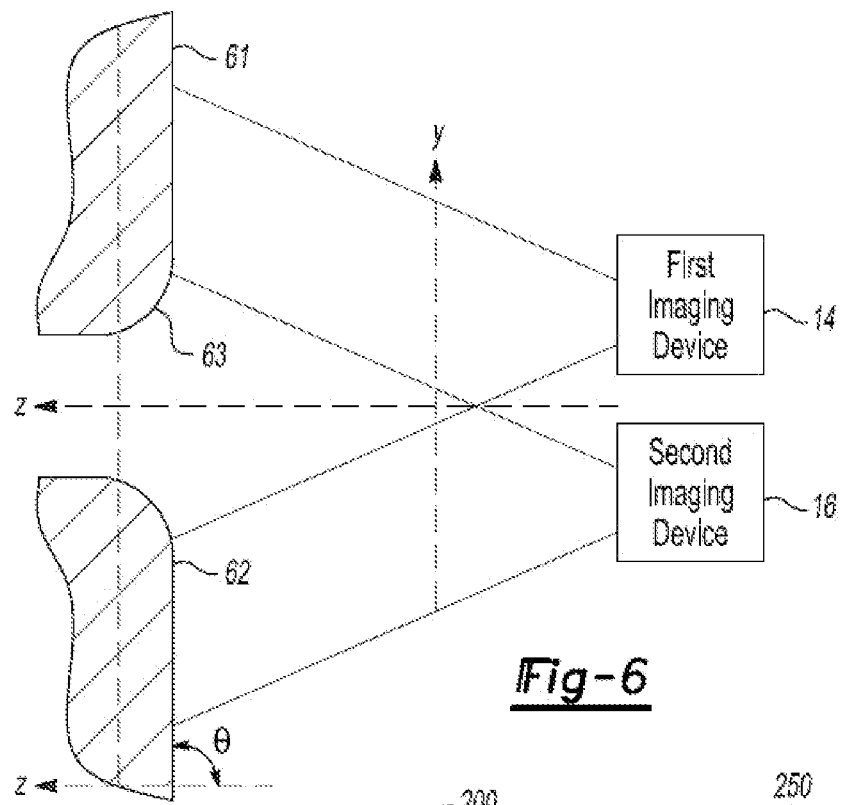
FIG. 6 is a diagram illustrating exemplary schemes for combining data from two or more imaging devices.

Once each of the components has been properly calibrated, image data captured by two or more imaging devices can be combined by the image processing unit 18. In an exemplary embodiment, image captured by each of the imaging devices 14, 16 is reported to the image processing unit 18. With reference to FIG. 6, image data from both of the imaging devices 14, 16 are then combined by the image processing unit 18. In a simplified scheme, image data captured by the first imaging device 14 above the z-axis is combined with image data captured by the second imaging device 16 below the z-axis, thereby forming a composite image. In other words, image data captured by the first imaging device 14 below the z-axis (i.e., having positive y coordinates) is discarded; whereas image data captured by the second imaging device 16 above the z-axis (i.e., having negative y coordinates) is discarded.

In a gap application, the non-contact sensing system 10 may be acquiring three-dimensional contour information in an area where two workpieces 61, 62 align. In this application, the image processing unit 18 may employ a more sophisticated scheme to combine the image data from two imaging devices. For example, the image processing unit 18 may compute the contour angle ($\Theta$) of the workpiece surface in relation to the z-axis. When the contour angle of the surface is +−45 degrees, the image data from the imaging devices is combined using the simplified scheme described above. When the contour angle of the surface exceeds +−45 degrees, data for the surface is no longer being captured by the applicable imaging device. For example, a portion of the surface indicated at 63 is no longer viewable to the first imaging device 14 but is viewable to the second imaging device 16. Thus, when the contour angle of the surface exceeds +−45 degrees, the image processing unit will use image data from the opposing imaging device to construct the composite image. Other schemes for combining data from multiple imaging devices are also contemplated by this disclosure.

Figure 7:
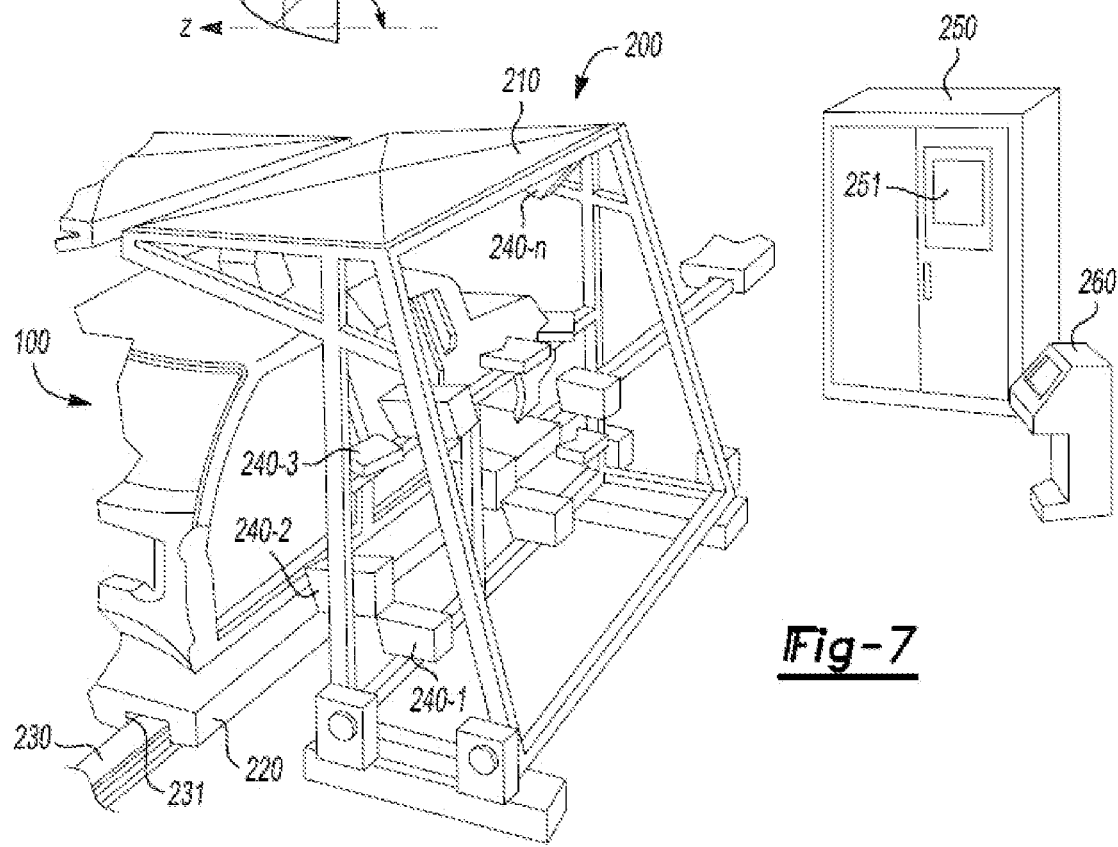
FIG. 7 is a diagram illustrating an exemplary gauging station.

A typical gauging station 200 for an automotive vehicle part could take the form shown in FIG. 7. Workpieces to be gauged at the gauging station 200 rest on transporting pallets 220, which are moved along an assembly line via pallet guides 230 that pass through guide channels 231 in the pallet. At the gauging station 200, a sensor mounting frame 210 (only one half of which is shown in figure) surrounds the workpiece 100 to be gauged and provides a plurality of mounting positions for a series of non-contact sensors 240-1 through 240-$n$.

Each of these non-contact sensors 240-$n$ may be configured in the manner described above. In other words, each sensor is comprised of two first source subsystems and two imaging devices arranged in a "reverse overlap" manner within a single housing as described in relation to FIG. 4. Image data captured by a sensor may be translated to measurement data at the sensor or at a remote computer 250. In either case, data is sent from the sensor to the remote computer 250 for further processing and/or storage. In some embodiments, one or more of these sensors may have overlapping fields of view and be calibrated to a common coordinate system. If one of the sensors needs to be replaced or otherwise re-calibrated, the given sensor can be calibrated to the common coordinate system using the method set forth above. More specifically, steps 52-54 of FIG. 5 can be performed to re-calibrate the given sensor in relation to the other sensors. In this way, sensors in a typical gauging station are calibrated in a more streamlined manner.

As used herein, the term module can refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module can include memory (shared, dedicated, or group) that stores code executed by the processor. The term code can include software, firmware, and/or microcode, and can refer to programs, routines, functions, classes, and/or objects. The term shared, as used above, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A non-contact sensing system for acquiring three-dimensional contour information, comprising:
    a first light source subsystem operable to scan a point of light in a first area of illumination and reports position of the point of light in a common coordinate system;
    a first imaging device having a field of view arranged to intersect substantially with the first area of illumination, the first imaging device operable to capture image data while the point of light is scanned in the first area of illumination and report the captured image data in the common coordinate system, where the point of light is scanned by the first light source subsystem at a rate higher than shutter speed of the first imaging device;
    a first control module in data communication with the first imaging device and the light source subsystem, the first control module operable to determine three-dimensional contour information for an object in the field of view of the first imaging device using triangulation, where the determination is made solely from the captured image data from the first imaging device and the position of the point of light reported by the first light source;
    a second light source subsystem operable to scan a point of light in a second area of illumination and reports position of the point of light in a common coordinate system;
    a second imaging device having a field of view arranged to intersect substantially with the second area of illumination, the second imaging device operable to capture image data while the point of light is scanned in the second area of illumination and report the captured image data in the common coordinate system, where the point of light is scanned by the second light source subsystem at a rate higher than shutter speed of the second imaging device; and
    a second control module in data communication with the second imaging device and the light source subsystem, the second control module operable to determine three-dimensional contour information for an object in the field of view of the second imaging device using triangulation, where the determination is made solely from the captured image data from the second imaging device and the position of the point of light reported by the second light source.

2. The non-contact sensing system of claim 1 wherein the light source subsystem employs a micro-electro-mechanical system (MEMS) actuated mirror to position the point of light and translates the position of the point of light as reported by the MEMS actuated mirror to a position of the point of light in the common coordinate system.

3. The non-contact sensing system of claim 1 wherein the first control module in data communication with the light source subsystem to control scanning of the plane of light in the first illumination area.

4. The non-contact sensing system of claim 1 wherein the light source subsystem further includes a laser light source arranged to project light towards a micro electro-mechanical system (MEMS) actuated mirror and a spherical mirror arranged to reflect light directed by the MEMS actuated mirror towards the area of illumination.

5. The non-contact sensing system of claim 1 wherein the field of view of the first imaging device intersects with the field of view of the second imaging device.

6. The non-contact sensing system of claim 1 wherein the first imaging device, the first control module, the second imaging device, and the second control module residing in a common housing.

7. The non-contact sensing system of claim 6 wherein the light source subsystem resides in the common housing.

8. The non-contact sensing system of claim 6 wherein the light source subsystem resides in a housing distinct and spatially separate from the common housing.

9. A non-contact sensor device for acquiring three-dimensional contour information, comprising:
    a first light source subsystem operable to project a point of light and scan the point of light in a first area of illumination, where the first light source subsystem uses a micro electro-mechanical system (MEMS) actuated mirror to scan the point of light;
    a first imaging device having a field of view arranged to intersect substantially with the first illumination area and operable to capture image data therein, where the point of light is scanned by the first light source at a rate higher than shutter speed of the first imaging device;

a second light source subsystem operable to project a point of light and scan the point of light in a second area of illumination that is adjacent to the first illumination area, where the second light source subsystem uses a micro electro-mechanical system (MEMS) actuated mirror to scan the plane of light; and a second imaging device having a field of view arranged to intersect substantially with the second illumination area without substantially intersecting with the first illumination area and operable to capture image data therein, where the point of light is scanned by the second light source at a rate higher than shutter speed of the second imaging device; wherein the first light source subsystem, the first imaging device, the second light source subsystem and the second imaging device reside in a housing of the device and the first and second light source subsystems are interposed collectively between the first and the second imaging device, such that the first light source subsystem is positioned between the second imaging device and the second light source subsystem and the second light source subsystem is positioned between the first imaging device and the first light source subsystem.

10. The non-contact sensor of claim 9 wherein the field of view of the first imaging device intersects with the field of view of the second imaging device.

11. The non-contact sensor of claim 9 further comprises a first control module in data communication with the first light source subsystem to control scanning of the plane of light in the first illumination area and to receive position of the point of light as reported by the first light source subsystem; and a second control module in data communication with the second light source subsystem to control scanning of the plane of light in the second illumination area and to receive position of the point of light as reported by the second light source subsystem.

12. The non-contact sensor of claim 11 wherein the first control module translates the position of the point of light as reported by the first light source subsystem to a position of the point of light in a common coordinate system, and the second control module translates the position of the point of light as reported by the second light source subsystem to a position of the point of light in the common coordinate system.

13. The non-contact sensor of claim 12 wherein the first control module in data communication with the first imaging device to determine location of an object in the field of view of the first imaging device from the image data captured by the first imaging device using triangulation and report the location of the object in the common coordinate system; and the second control module in data communication with the second imaging device to determine location of an object in the field of view of the second imaging device from the image data captured by the second imaging device using triangulation and report the location of the object in the common coordinate system, where the first control module operates independently from the second control module.

14. The non-contact sensor of claim 1 further comprises an image processing unit receives image data captured by the first imaging device and the second imaging device and generates a single image from the captured image data.

15. The non-contact sensor of claim 9 wherein the first light source subsystem further includes a laser light source arranged to project light towards the MEMS actuated mirror and a spherical mirror arranged to reflect light directed by the MEMS actuated mirror towards the area of illumination.

16. A non-contact sensing system for acquiring three-dimensional contour information, comprising:

a light source subsystem operable to scan a point of light in an area of illumination and report position of the point of light in a common coordinate system;

a first imaging device having a field of view arranged to intersect with the illumination area, wherein the first imaging device operates to capture image data in a localized reference frame and report the image data in the common coordinate system which differs from the localized reference frame;

a second imaging device having a field of view arranged to intersect with the illumination area, wherein the second imaging device operates to capture image data in a localized reference frame and report the image data in the common coordinate system, where the point of light is scanned by the light source subsystem at a rate higher than shutter speed of the first imaging device and the second imaging device;

a first control module in data communication with the first imaging device and the light source subsystem, the first control module operates using triangulation to determine three-dimensional contour information for an object in the field of view of the first imaging device from the captured image data and the position of the point of light as received from the light source subsystem and without the use of image data from the second imaging device; and a second control module in data communication with the second imaging device and the light source subsystem, the second control module operates using triangulation to determine three-dimensional contour information for an object in the field of view of the second imaging device from the captured image data and the position of the point of light as received from the light source subsystem and without the use of image data from the first imaging device.

* * * * *